United States Patent
Stienstra

(10) Patent No.: US 7,685,585 B1
(45) Date of Patent: Mar. 23, 2010

(54) CREATING AN EXPLICIT FLOW CONTROL IN AN IMPLICIT FLOW PROGRAMMING ENVIRONMENT

(76) Inventor: Brian Stienstra, 10 Sanford Ave., DeBary, FL (US) 32713

( * ) Notice: Subject to any disclaimer, the term of this patent is extended or adjusted under 35 U.S.C. 154(b) by 1384 days.

(21) Appl. No.: 11/102,138

(22) Filed: Apr. 8, 2005

(51) Int. Cl.
*G06F 9/45* (2006.01)
(52) U.S. Cl. .................. 717/154; 717/153; 717/155
(58) Field of Classification Search .......... 717/153–155
See application file for complete search history.

(56) References Cited

U.S. PATENT DOCUMENTS 7,140,004 B1 * 11/2006 Kunins et al. ............... 717/125

2005/0091059 A1 * 4/2005 Lecoeuche ............... 704/270.1

* cited by examiner

*Primary Examiner*—Wei Y Zhen
*Assistant Examiner*—Junchun Wu
(74) *Attorney, Agent, or Firm*—Frost Brown Todd LLC; William S. Morriss

(57) ABSTRACT

Creating explicit control flow in an implicit control flow development environment. A set of explicit functions is defined in a library associated with the implicit control flow development environment. Each of the explicit functions in the set is associated with a sequence of implicit functions, such that by calling the explicit function, the sequence of selected implicit functions are called to programmatically perform the task defined by the explicit function. Property types may be designated for the explicit functions, wherein the property types are used by the sequence of implicit functions in performing the task. The explicit functions are exposed to a developer using the implicit flow development environment. The developer selects the desired explicit functions and properties for creation and execution of the application.

20 Claims, 3 Drawing Sheets

FIG. 4

```
case "qaZipSuccess":                                              ⟋40
    switch(type){
        case"Initialization": ⟋402
            GoalProgress(GETZIP, "FINALVALUE", getSIValue("siZip"));
            GoalComplete(GETZIP);
            prompt.setPlayOnce();
            if(getTotalErrorCount("qaGetZip")>0||(getVar("zipCount")>1)){   ⎫
404 ⟋          prompt.initialPrompt[0]=appendPhrase(510);                    ⎬ 403
            }else{                                                           ⎭
405 ⟋          prompt.initialPrompt[0]=appendPause(1);
            }
            return true;
        case"Activation": ⟋406
            return playOnceActivation (getActivationState(QAname, lastCommand,
type));

case"Complete": ⟋407
            if(getSIValue("siZip")=="dont_know"){                  ⎫
409 ⟋          forceNextControl("qaGetCityState");                  ⎪
            }else if (openTodayFeature()){                          ⎪
410 ⟋          forceNextControl("qaOpenToday");                     ⎬ 408
            }else{                                                  ⎪
411 ⟋          forceNextControl("qaLookupMessage");                 ⎪
            }                                                       ⎭
            return false;
    }
```

400 { 401 { ...

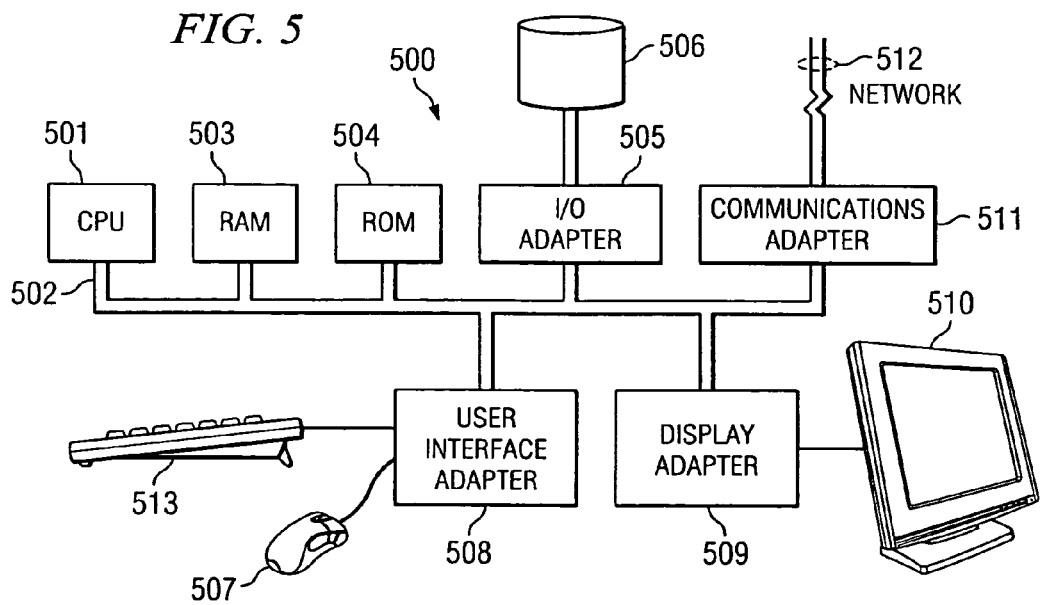

FIG. 5

CREATING AN EXPLICIT FLOW CONTROL IN AN IMPLICIT FLOW PROGRAMMING ENVIRONMENT

TECHNICAL FIELD

The present invention relates, in general, to application development environments and, more specifically, to a framework for creating an explicit flow control in an implicit flow programming environment.

BACKGROUND OF THE INVENTION

Computers possess the ability to perform many calculations very quickly. Most single-processor computers are capable of performing only one calculation at a time. Thus, early programming and programming languages defined sequential steps that control the procedure of a desired task. The types of computer languages that were developed to implement these sequential processes are called procedural languages, such as C/C++, FORTRAN, and the like. In such procedural languages, the control of the computer processing is explicitly controlled.

As Internet technology has grown, a greater emphasis began to be placed on the visual aspects of the computer interface. Commensurate with this change in outlook, programming languages were developed that were more concerned with defining the final appearance of the computer interface. In these languages, such as Extensible Markup Language (XML), Hypertext Markup Language (HTML), and the like, control of the computer processing is much more implicit. The appearance of a Web page, being rendered in a large visual canvas, may be created using a more asynchronous approach. A general order of execution is provided that executes the various steps in populating the Web page. Because of its visual emphasis, this implicit flow control paradigm is more common in Web-related programming.

The explicit flow control paradigm is also commonly used in the development of speech-related applications, such as those running on Interactive Voice Response (IVR) units and the like. Because the flow of a speech application is typically driven by caller responses, explicit flow control has become the logical programming solution in historical IVR and speech-related application development.

Over the last 10 years, the reach and capabilities of the Internet has steadily advanced. As Internet technology begins to reach the capabilities to handle typical voice-related applications, a merging has begun to occur between the Internet/World Wide Web and speech application technology, formerly reserved for dedicated UVR units and servers. The beginnings of this merge, however, has resulted in application development environments (ADEs) from Web-centered software companies that utilize implicit flow control to code voice or speech applications that have historically been programmed using explicit controls flow. While this implicit flow paradigm lends itself to the declarative-language, Web-related world, it can be problematic when used in the speech application world.

Using implicit flow control ADEs, speech applications result in disjointed and programmatically complex logic that is used to create applications with somewhat rigid flow execution. One example of such an implicit flow control ADE is Microsoft Corporation's SPEECH.NET™. SPEECH.NET™ is a development kit that may be added onto Microsoft Corporation's VISUALSTUDIO.NET™ ADE. By adding the SPEECH.NET™ library to VISUALSTUDIO.NET™, speech applications may be developed for Web-based speech applications run by speech servers, such as Microsoft Corporation's MICROSOFT SPEECH SERVER™.

Speech applications that are developed using SPEECH.NET™ typically result in complex, large programs that contain numerous, seemingly unrelated functions that are spread out through the code. Additionally, record of the speech prompts used in executing the speech application are also scattered through the code at various locations. This type of application may be suited for the implicit flow control of general Web development and Web design, but creates difficulties for speech developers to efficiently develop and maintain speech applications.

These problems do not just arise in speech application technology. Other Web-based programming technologies may result in such disjointed and programmatically complex application because an implicit flow control paradigm is used to create the underlying application code.

BRIEF SUMMARY OF THE INVENTION

The present invention is related to a system and method for changing an implicit flow control ADE into an explicit flow control ADE, while preserving the underlying implicit flow control design. An explicit flow framework is created by defining a set of explicit functions for a library that may be used by the implicit ADE. Each of the explicit functions programmatically abstracts one or more of the implicit functions native to the implicit ADE. The library developer assembles the selected implicit functions in order to carry out the task defined by the explicit function. When added to the implicit ADE, the explicit library exposes the explicit functions to the ADE user through an explicit Application Programming Interface (API) that may be mapped to the native implicit functionality in the implicit API, such that the ADE user may develop an application that utilizes explicit flow control instead of the native implicit flow functionality of the implicit ADE. Moreover, should the native implicit API of the implicit ADE change, the library developer only needs to change the mapping between the explicit API and the new implicit API functions. The ADE user does not have to learn the new functions of the implicit API, but rather may keep using the explicit API as before.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4 is an example of a code segment illustrating the results of implementing one embodiment of the present invention;

FIG. 5 illustrates a computer system adapted to use embodiments of the present invention.

DETAILED DESCRIPTION OF THE INVENTION

Before discussing the details of the various embodiments of the present invention, it may be beneficial to discuss more detail of the existing implicit ADE systems. One example of such an implicit ADE is the SPEECH.NET™ ADE. SPEECH.NET™ generally uses a Web programming model for building voice applications. The basic programming elements in SPEECH.NET™ are referred to as Question-Answers (QAs). QAs have events associated with them which can be tied to various functions. Each of the QAs execute in an order determined by a speech index. The speech index is an ordering index that the system refers to when executing the QAs. The ADE users can control the flow of speech applications coded using SPEECH.NET™ by designing the order of the QAs in the speech index.

When executed, a QA may entail playing a prompt to a caller. Therefore, when a QA provides for the presentation of a prompt, it executes a prompt function that determines which prompt the QA is to play. Because there may be several different possible prompts that could be played at various times and in response to various caller input, the prompt functions as well as the prompt representation may be and typically are placed at any point in the application code.

Additionally, QAs may be tied to other functions, such that when the QA is activated, another function may be called to perform some type of processing. The QA may call various different functions based on the input present. However, this input may be received at different times along the execution of the speech application. Therefore, the resulting code includes multiple functions that may be associated with a single QA, but which are located at various points interspersed among the rest of the application code.

The resulting code, therefore, may have multiple functions located at various locations throughout the code in addition to various prompts and prompt functions interspersed throughout the code. The maintenance of such applications becomes very difficult for programmers, because there is typically no central location or set of rules for determining where such functions and prompts may be placed. Typically, in large software applications, multiple developers are used to create and maintain the applications. Therefore, a programmer who was not involved in the creation of the code would not be familiar with the organization of the code logic. It may, thus, greatly increase the time necessary to understand the structure and functions of the application.

Figure 1:
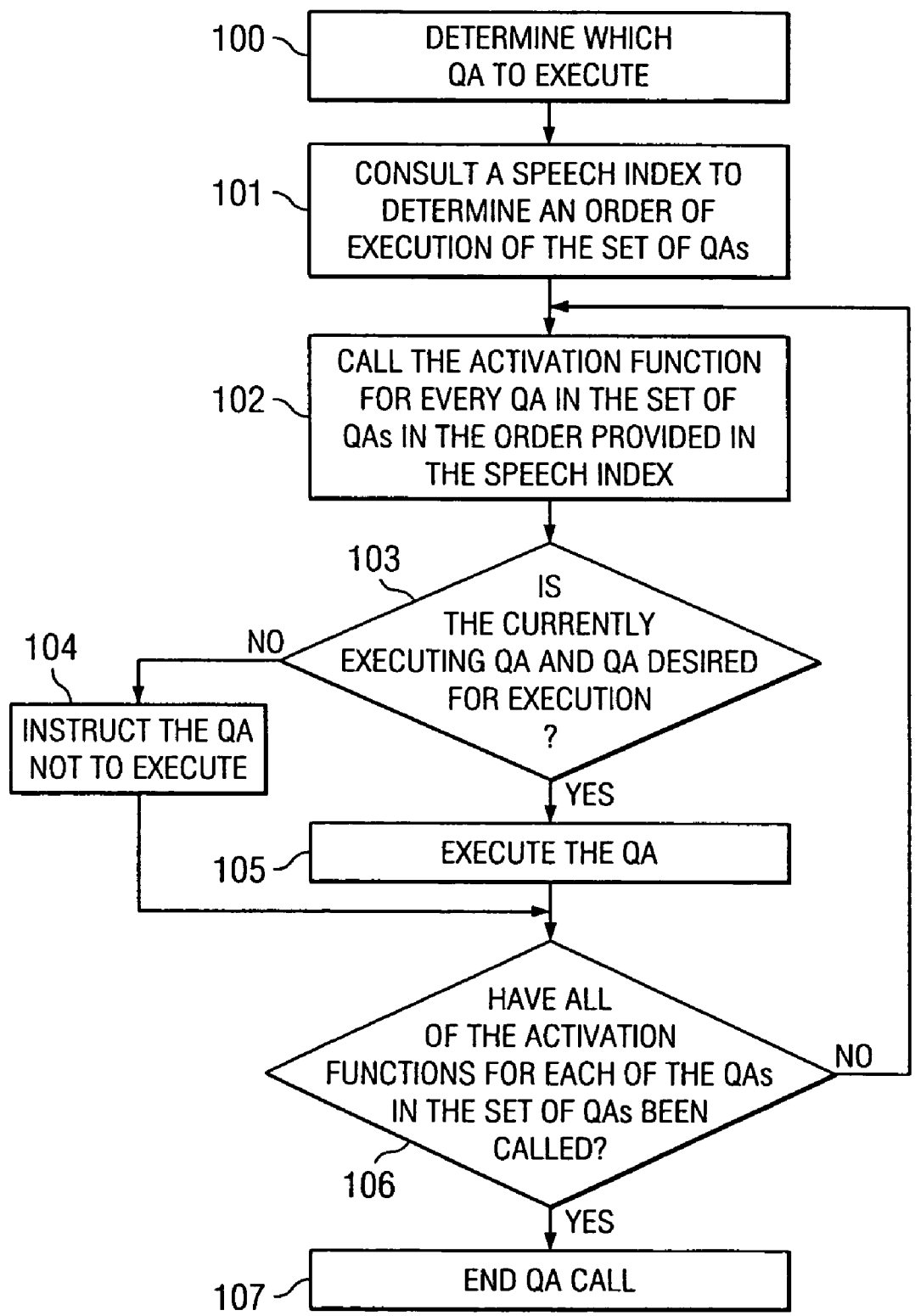
FIG. 1 is a flowchart illustrating steps used in existing implicit flow speech application development environments, such as Microsoft Corporation's SPEECH.NET™.

FIG. 1 is a flowchart illustrating steps used in existing implicit flow speech application development environments, such as Microsoft Corporation's SPEECH.NET™. In step 100, a developer determines which QA to execute. The speech index is consulted, in step 101, to determine an order of execution of the set of QAs. In step 102, the activation function is called for every QA in the set of QAs in the order provided in the speech index. A determination is made, in step 103, whether the currently activated QA is the QA desired for execution? If not, the developer writes code instructing the QA not to execute in step 104. Otherwise, in step 105, the QA is executed. In step 106, a determination is made whether all of the activation functions for each of the QAs in the set of QAs have been called? If not, the process is repeated from by executing step 102. Otherwise, the call to the QA is ended in step 107. In contrast, using an explicit flow control paradigm, the explicit ADE user would merely code a step for the desired QA to execute. The difference in programmatic complexity is enormous.

It should be noted that the various embodiments of the present invention provide a system and method for creating an explicit flow control programming model on top of the implicit flow control programming model in implicit ADEs. The examples given with regard to speech application technology is given purely for example. Various other technologies that employ an implicit flow control methodology, such as Web development, rich Internet application development, and the like may benefit from application of the various embodiments of the present invention.

Figure 2:
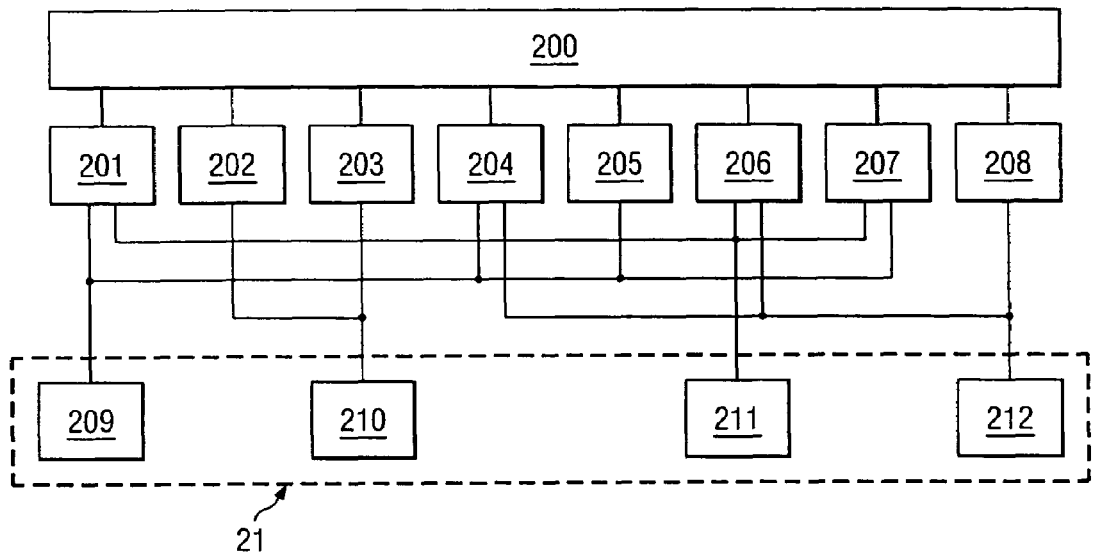
FIG. 2 is a block diagram illustrating an ADE configured according to one embodiment of the present invention.

FIG. 2 is a block diagram illustrating ADE 20 configured according to one embodiment of the present invention. ADE 20 comprises execution code 200, which may be machine language, assembly language, or other type of low-level computer instruction set that implements higher-level instruction sets, such as implicit functions 201-208 to perform the function tasks. In addition to these native pieces of ADE 20, explicit library 21 has been added that also uses execution code 200 to perform desired function tasks. Explicit library 21 includes a number of explicit function 209-212 that are exposed to the users of ADE 20 in creating applications. The users of ADE 20 may code applications using explicit functions 209-212 to control the logic of the desired application functionality. When any of explicit functions 209-212 are used in an application, ADE 20 consults/accesses explicit library 21 to determine how to execute the tasks desired.

Each of explicit functions 209-212 is an programmatic abstraction of a collection of ones of implicit functions 201-208. For example, explicit function 209 is a programmatic abstraction of implicit functions 201, 204, 205, and 207. When a user of ADE 20 calls explicit function 209, ADE 20 executes implicit functions 201, 204, 205, and 207 in the order used for completing the desired task or tasks. Therefore, by selectively grouping explicit functions 209-212, the user of ADE 20 can create program logic that explicitly controls the flow of the application without the onus of manually creating the programmatic complexity of assembling the selected ones of implicit functions 201-208 directly.

For example, explicit function 209 may be a function that designates the next QA to execute. For purposes of this example, explicit function 209 is labeled forceNextControl. A user of ADE 20 may include the function call to forceNextControl (as explicit function 209) when he or she desires to call a QA for playing a voice prompt for retrieving caller password information. The function may include properties for designating the specific QA to execute. Thus, the developer may write forceNextControl(pwdRequest) in order to call the pwdRequest QA that plays the prompts to request the caller for password information and record such information. When the compiler for ADE 20 reaches this line of code, it executes implicit functions 201, 204, 205, and 207 using pwdRequest as the designated QA to execute. Again, for purposes of this example, the combination of implicit functions 201, 204, 205, and 207 may execute the steps detailed in FIG. 1. Thus, while the user of ADE 20 only wrote the line "forceNextControl(pwdRequest)" into his or her line of code, ADE 20 executed steps 100-107 (as needed) to implement the call of the pwdRequest QA. The user of ADE 20 did riot see any of this execution of implicit functions 201-208, but only knows that the next QA called is pwdRequest.

Figure 3:
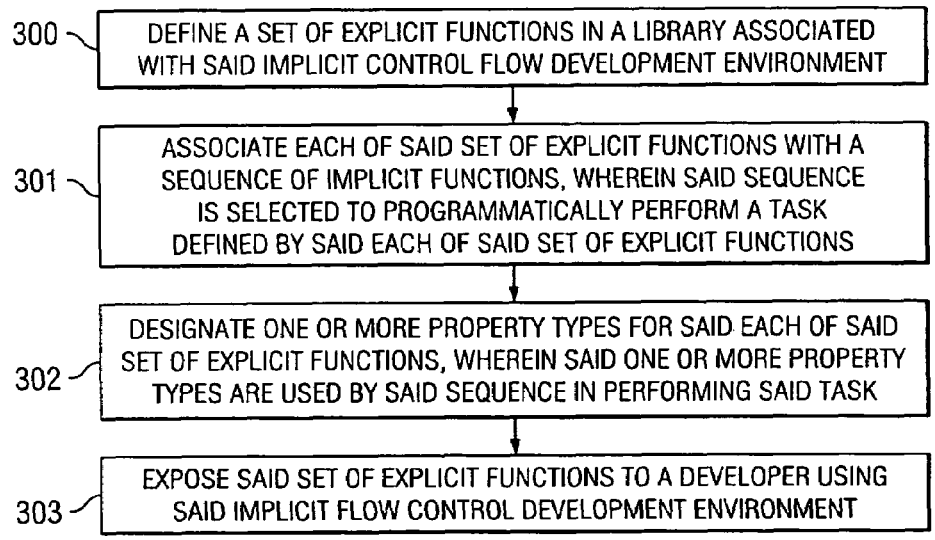
FIG. 3 is a flowchart illustrating example steps performed in implementing one embodiment of the present invention.

FIG. 3 is a flowchart illustrating example steps performed in implementing one embodiment of the present invention. In step 300, a set of explicit functions is defined in a library associated with said implicit control flow development environment. Each of the explicit functions is associated with a sequence of implicit functions, in step 301, wherein the sequence is selected to programmatically perform a task defined by each of the explicit functions. One or more property types is designated, in step 302, for each of the explicit functions, wherein property types are used by the sequence of implicit functions in performing the task. In step 303, expose the set of explicit functions to a developer using the implicit flow control development environment.

FIG. 4 is an example of code segment 40 illustrating the results of implementing one embodiment of the present invention. Code segment 40 comprises one or multiple cases in a switch statement. Zip success case 400 is a QA that may be executed after a successful attempt to elicit a zip code from a participating caller. Each QA in the inventive embodiment includes at least three cases: initialization case 402, activation case 406, and complete case 407. Initialization case 402 sets all of the variables and properties used in executing the QA. Activation case 406 sets up activation of the QA, and complete case 407 controls the flow of the program once the function of the QA has been successfully completed.

A switch statement is a common procedural/explicit programmatic control device in procedural programming languages. However, in order to effectuate a switch statement in an implicit flow control environment each possible selection is programmatically controlled by a code block that calls each possible selection, but only allows execution of the selection that is desired to execute. This programmatic block would be repeated for each possible selection for each execution criteria.

Within initialization case 402, if-else expression 403 provides controlled execution of different prompts in prompt statements 404 and 405. Prompt statements 404 and 405 illustrate a simple call to the exact prompt selection desired for presentation. In the embodiment of the present invention illustrated in FIG. 4, all prompts are placed into a single prompt array file. When a prompt is desired for execution a prompt statement is made that refers to the index of the prompt in the prompt file that is desired for presentation. Thus, prompt statement 404, which is played if there were any errors in the QA for getting the zip code or if a zip count is greater than 1, will play the prompt at "appendPhrase (510)."

In contrast, implicit flow ADEs, such as SPEECH.NET™ would, again, use a large amount of code just to perform the conditional statement logic. Moreover, in SPEECH.NET™, prompt functions, which may reside anywhere within the document, are called to determine what prompt to play and to then call that prompt for playing. Thus, the various embodiments of the present invention allow the developer to control the procedure of the processing responsive to the caller's directions without requiring the developer to programmatically define each contingent conditional statement or execution for each desired prompt.

If-else statement 408 within complete case 407 contains conditional statements for directing the progress of the application. Depending on the execution conditions, complete case 407 may run QA 409 to get the city and state, QA 410 to run the open today feature, or QA 411 which looks up a message. This simple code in an explicit flow control methodology would require a large amount of code when implemented in an implicit flow control environment. As discussed with regard to FIG. 1, for each QA that is desired to be run, the activation function for every QA would be called but programmatically instructed not to execute unless it is the desired QA. This process would be repeated for each of QA 409-411. Instead, the explicit flow control methodology provides the same functionality in a logical, simple, familiar format.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

FIG. 5 illustrates computer system 500 adapted to use embodiments of the present invention, e.g. storing and/or executing software associated with the embodiments. Central processing unit (CPU) 501 is coupled to system bus 502. The CPU 501 may be any general purpose CPU. However, embodiments of the present invention are not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O adapter card 505 connects storage devices 506, such as one or more of a hard drive, a CD drive, a floppy disk drive, a tape drive, to computer system 500. The I/O adapter 505 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 511 is adapted to couple the computer system 500 to a network 512, which may be one or more of a telephone network, a local (LAN) and/or a wide-area (WAN) network, an Ethernet network, and/or the Internet network. User interface card 508 couples user input devices, such as keyboard 513, pointing device 507, and the like, to the computer system 500. The display card 509 is driven by CPU 501 to control the display on display device 510.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer implemented method for creating explicit control flow in an implicit control flow development environment, said method comprising:

defining a set of explicit control flow functions in a library stored on a computer readable storage media, said set of explicit functions related to said implicit control flow development environment;

associating each of said set of explicit control flow functions with a sequence of implicit control flow functions stored on said computer readable storage media and native to said implicit control flow development environment, wherein said sequence is selected to programmatically perform a task explicitly defined by said each of said set of explicit control flow functions; and exposing said set of explicit control flow functions to a developer through said library using said implicit flow control development environment.

2. The method of claim 1 further comprising:

designating one or more property types for said each of said set of explicit control flow functions, wherein said one or more property types are used by said sequence in performing said task.

3. The method of claim 1 further comprising:

receiving selection by said developer of one or more functions of said set of explicit control flow functions;

obtaining one or more properties from said developer for said one or more property types; and executing said one or more selected functions to perform said task.

4. The method of claim 3 further comprising:

processing said selection of said one or more functions.

5. The method of claim 4 wherein said processing comprises:

accessing said library; and calling said sequence of associated implicit control flow functions.

6. The method of claim 1 wherein said implicit control flow development environment is a speech-related application development environment (ADE), said method further comprising:

defining a prompt array for storing a plurality of voice prompts for use in a speech application; and creating a prompt function for calling ones of said plurality of voice prompts in said prompt array according to an index of said prompt array.

7. A system comprising:

a central processing unit (CPU);

a storage device coupled to said CPU;

an implicit control application development environment (ADE) stored on said storage device; and a software library stored on said storage device and related to said implicit control ADE, wherein said software library comprises:

an interface to facilitate interaction with said implicit control ADE;

a plurality of functions defined to explicitly control functionality of said implicit control ADE, wherein each of said plurality wrappers a predetermined set of implicit control flow functions; and an association record identifying an association between each of said plurality and said predetermined set.

8. The system of claim 7 wherein said software library further comprises:

one or more properties for ones of said plurality of functions, wherein said one or more properties is consumed by one or more of said set of implicit control flow functions.

9. The system of claim 7 wherein said implicit control ADE exposes said plurality of functions to a user of said implicit control ADE.

10. The system of claim 7 wherein said implicit control ADE is a speech-related ADE and wherein said software library further comprises:

an access method to a prompt array for storing one or more prompts used in a speech-related application; and a prompt function that calls a desired one of said one or more prompts using an index of said prompt array.

11. A computer program product having a computer readable storage medium with computer program logic recorded thereon for creating explicit control flow in an implicit control development environment, said computer program product comprising:

code for abstracting a predefined set of implicit control codes code into one or more explicit function wrappers, wherein said predefined set performs a desired operation;

code for assembling said one or more explicit function wrappers into a software library;

code for associating said software library with said implicit control development environment; and code for exposing said one or more of explicit function wrappers to a developer.

12. The computer program product of claim 11 further comprising:

code for receiving one or more function selections from said software library by said developer, wherein said one or more function selections includes zero or more properties, wherein said zero or more properties are consumed by said predefined set of implicit control code; and code for executing said one or more function selections.

13. The computer program product of claim 12 wherein said code for executing comprises:

code for accessing said software library; and code for calling said predefined set of implicit control code abstracted by said one or more function selections.

14. The computer program product of claim 11 wherein said implicit control development environment is a speech-related application development environment (ADE), said computer program product further comprising:

code for defining a prompt array for storing a plurality of voice prompts used in a speech application; and code for calling ones of said plurality of voice prompts in said prompt array according to an index of said prompt array.

15. A computer implemented method comprising:
creating a plurality of explicit control functions in a software library stored on a storage device, where said software library is operable with an implicit control application development environment (ADE) executed by a central processing unit (CPU) coupled to said storage device;
relating each of said plurality of explicit control functions with a progression of implicit logic, wherein said progression is selected to programmatically perform one or more operations defined by said each of said plurality of explicit control functions; and
exposing said plurality of explicit control functions to a developer using said implicit control ADE.

16. The computer implemented method of claim 15 further comprising:
defining one or more properties for ones of said plurality of explicit control functions, wherein said one or more properties are used by said progression in performing said one or more operations.

17. The computer implemented method of claim 16 further comprising:
reading selections of one or more of said plurality of explicit control functions by said developer, wherein said selections include said one or more properties.

18. The computer implemented method of claim 17 further comprising:
processing said selections.

19. The computer implemented method of claim 18 wherein said processing comprises:
accessing said software library; and
calling said progression of related implicit logic.

20. The computer implemented method of claim 15 wherein said implicit control ADE is a speech-related ADE, further comprising:
creating a prompt array for storing a plurality of voice prompts used in a speech application; and
calling ones of said plurality of voice prompts in said prompt array according to an index of said prompt array.

* * * * *

UNITED STATES PATENT AND TRADEMARK OFFICE
CERTIFICATE OF CORRECTION

PATENT NO.       : 7,685,585 B1                                     Page 1 of 1
APPLICATION NO.  : 11/102138
DATED            : March 23, 2010
INVENTOR(S)      : Brian Stienstra It is certified that error appears in the above-identified patent and that said Letters Patent is hereby corrected as shown below:

In the specification, an error exists in line 50 of column 1. Therefore, the following changes should be made:

As Internet technology begins to reach the capabilities to handle typical voice-related applications, a merging has begun to occur between the Internet/World Wide Web and speech application technology, formerly reserved for dedicated <u>IVR</u> [[UVR]] units and servers.

In the specification, an error exists in line 12 of column 5. Therefore, the following changes should be made:

The user of ADE 20 did <u>not</u> [[riot]] see any of this execution of implicit functions 201-208, but only knows that the next QA called is pwdRequest.

In claim 11, an error exists in lines 36-44 of column 8. Therefore, the following changes should be made to claim 11:

11. A computer program product having a computer readable storage medium with computer program logic recorded thereon for creating explicit control flow in an implicit control development environment, said computer program product comprising: code for abstracting a predefined set of implicit control codes [[code]] into one or more explicit function wrappers, wherein said predefined set performs a desired operation; code for assembling said one or more explicit function wrappers into a software library; code for associating said software library with said implicit control development environment; and code for exposing said one or more [[of]] explicit function wrappers to a developer.

Signed and Sealed this

Eleventh Day of May, 2010

David J. Kappos
*Director of the United States Patent and Trademark Office*